(12) United States Patent
Rzyski

(10) Patent No.: US 6,369,849 B1
(45) Date of Patent: Apr. 9, 2002

(54) REMOTE INSPECTION DEVICE

(75) Inventor: Gene Rzyski, Irvine, CA (US)

(73) Assignee: Vosi Technologies, Inc., Costa Mesa, CA (US)

( * ) Notice: Subject to any disclaimer, the term of this patent is extended or adjusted under 35 U.S.C. 154(b) by 0 days.

(21) Appl. No.: 09/240,021

(22) Filed: Jan. 28, 1999

(51) Int. Cl.$^7$ .................................................. H04N 7/18
(52) U.S. Cl. .............................. 348/61; 348/73; 348/82; 348/158
(58) Field of Search ................................ 348/64–65, 66, 348/61, 73, 77, 82, 143, 148–149, 158, 162; 600/109, 112

(56) References Cited

U.S. PATENT DOCUMENTS

| | | | | |
|---|---|---|---|---|
| 4,604,992 A | * | 8/1986 | Sato | 600/108 |
| 4,949,186 A | * | 8/1990 | Peterson | 386/107 |
| 5,012,335 A | * | 4/1991 | Cohodar | 348/158 |
| 5,016,098 A | * | 5/1991 | Cooper et al. | 348/66 |
| 5,056,097 A | * | 10/1991 | Meyers | 372/38 |
| 5,079,629 A | * | 1/1992 | Oz | 348/77 |
| 5,546,124 A | * | 8/1996 | Scerbo, III | 348/158 |
| 5,662,586 A | * | 9/1997 | Monroe et al. | 600/110 |

* cited by examiner

Primary Examiner—Vu Le
(74) Attorney, Agent, or Firm—Drummond & Duckworth

(57) ABSTRACT

A remote inspection device is provided which is ideally suited for law enforcement and firefighting personnel. The remote inspection device includes an elongate housing, camera means and power supply for powering the camera means and video display. The camera means operates in the invisible light spectrum, preferably the infrared (IR) spectrum. The camera means creates an image of an object which is transmitted to the video display for producing a visible light image of the object to be evaluated.

19 Claims, 4 Drawing Sheets

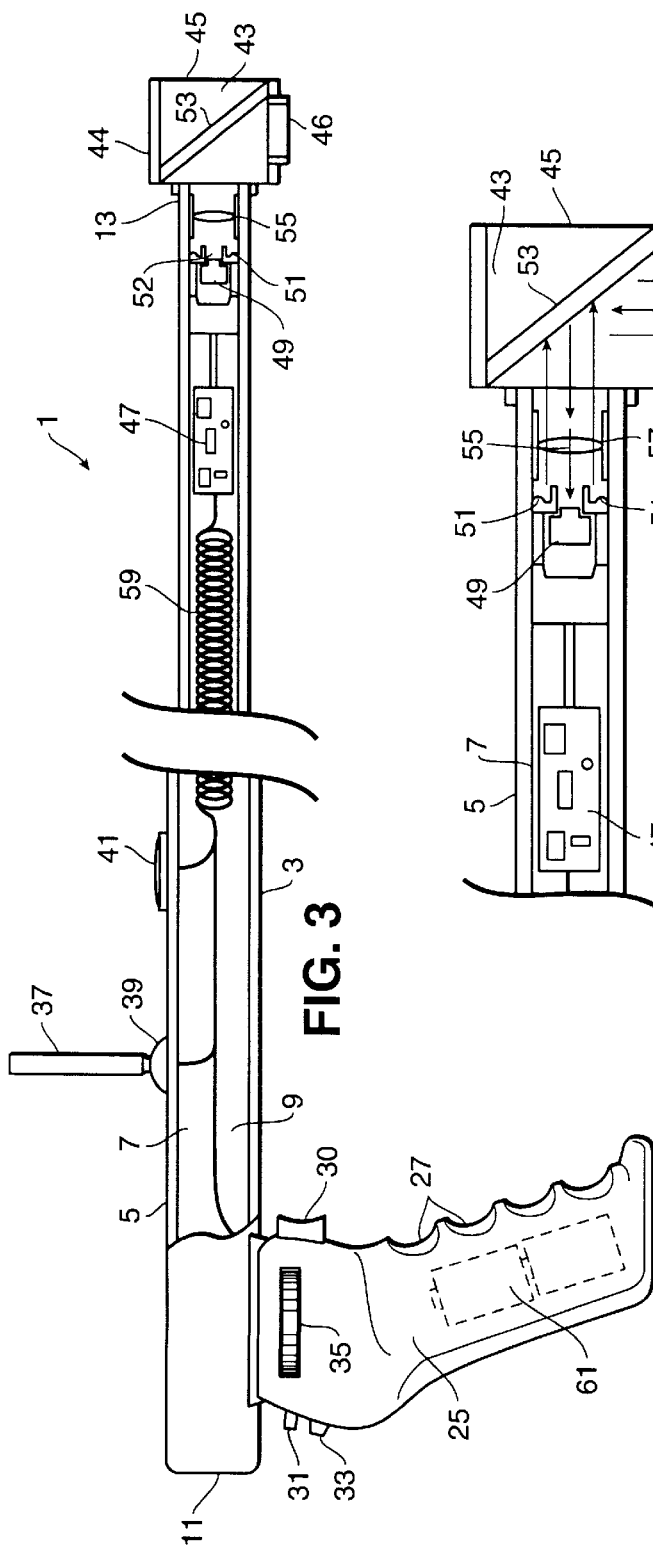
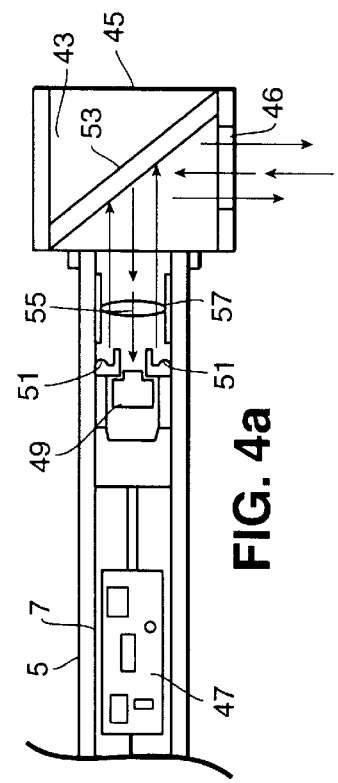
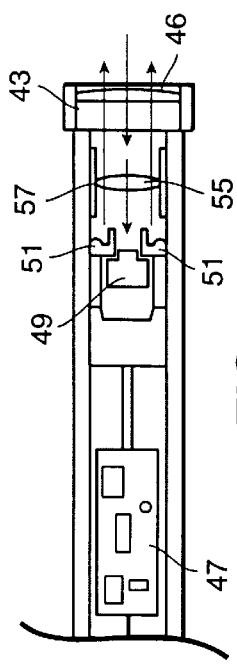
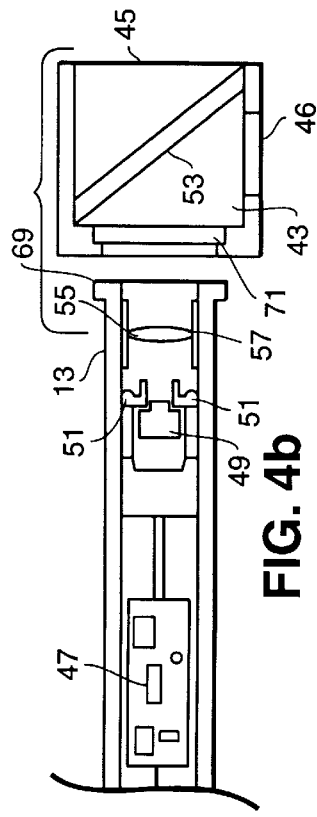

REMOTE INSPECTION DEVICE

BACKGROUND OF THE INVENTION

The present invention relates generally to remote inspection devices.

More particularly, the invention relates to cameras which operate in spectrums of light which are not visible to the human eye for use in observing and inspecting objects which are in difficult to view locations.

Alarming statistics are available relating to the death or serious injury of police officers when performing normal police activities. For example, an automobile may be stopped by the police for what may be considered a minor or normal traffic violation. This routine traffic stop is conducted by law enforcement personnel thousands of times each day. Though traffic stops are typically safe, they can become the most dangerous situations encountered by law enforcement personnel. When the police officer leaves his vehicle to inspect or interview the person stopped, he sometimes encounters dangerous situations where the motorist is retaliatory or unbeknownst to the police officer, has committed a serious crime. In such situations, the police officer is extremely vulnerable to attack as a view of a motorist is obscured by the vehicle, and generally, the motorist cannot be seen until the police officer is only a few feet away. Traffic stops are particularly dangerous when a motorist is stopped in a relatively isolated area by a lone police officer. In such situations, it is relatively easy for a motorist to initiate a surprise attack of a police officer using a weapon such as a knife or gun. The motorist has been known to attempt an escape, sometimes after attempting to harm or kill the police officer. Accordingly, police officers are increasingly placed in demanding situations wherein their safety is in jeopardy.

Moreover, more and more motorists are placing window tinting upon the windows of their automobiles. This window tinting can impede a view into the automobile, or can make the windows completely opaque as seen by a person outside of the automobile. This window tinting makes police officers even more vulnerable to attack. Police officers in such circumstances have been attacked and in some instances killed. Thus, it would be greatly advantageous if the police officers were provided with devices which visually pierce the tinted windows and would enable them to look within a vehicle from a more distant location or from a position less vulnerable to attack.

Dangerous situations are also encountered by firefighting personnel when they are attempting to extinguish a fire in a burning building. In fighting the fire, the firefighting personnel are often required to enter the building to search for survivors or to fight the fire itself. Unfortunately, upon entering a burning building, the vision of the firefighting personnel can be severely obstructed by smoke, fumes or the like. This can place the firefighting personnel in great danger and can severely impede the firefighter's ability to search for survivors or extinguish the fire. Accordingly, there is a obvious need for an observation device which is capable of "seeing" through smoke, fumes or the like to aid firefighting personnel in their activities.

Law enforcement such as border patrol, customs, drug enforcement and treasury agents all encounter circumstances wherein it is difficult to conduct inspections. For example, each of these agencies must often inspect the undercarriages of vehicles, such as automobiles or trucks, for drugs, stolen property, explosives, etc. Unfortunately, it is often difficult for law enforcement personnel to position themselves below a vehicle for inspection. Accordingly, vehicles, due to their mobility and ubiquitous nature, have become a major resource for smugglers who wish to illegally transport objects from one location to another. Accordingly, it would be greatly advantageous if these law enforcement personnel were provided with an inspection device which would enable them to search difficult to view locations, such a below vehicles, around corners, on rooftops, in narrow crawlspaces, etc.

None of the known prior art discloses a remote inspection device which would meet the aforementioned needs of law enforcement and firefighting personnel. For example, U.S. Pat. No. 4,949,186 issued to Peterson discloses a vehicle mounted surveillance system. Similarly, U.S. Pat. No. 5,012,335 issued to Cohodar discloses a video camera and video recording assembly disposed within a police vehicle. Unfortunately, these references disclose devices which are too bulky, and restricted to use within a vehicle, to be capable of being used easily by personnel to inspect difficult to see locations. In addition, these devices are not capable of looking through medium such as smoke, tinted windows or the like.

Meanwhile, U.S. Pat. No. 5,546,124 issued to Scerbo III discloses a handgun holster-mounted surveillance camera. The camera is activated upon a police officer removing his gun from its holster. This device is particularly useful for recording situations where a police officer is able to draw his gun. However, this device is useless where the police officer has been completely surprised and has been ambushed. Moreover, this device does not include the ability to reduce the vulnerability of a police officer, but instead, records the outcome wherein a police officer has already been placed in a vulnerable position.

U.S. Pat. No. 5,056,097 issued to Meyers discloses a targeting illuminating system which is mounted on a firearm or the like. The device is capable of illuminating a target in infrared light and includes a viewing apparatus for displaying a picture of an object illuminated by the infrared light. Unfortunately, this device is not configured for easy manual manipulation by a user to inspect difficult to view locations.

It would be highly desirable to provide a remote inspection device which can be used by the police in conducting operations such as routine traffic stops, to view objects which are in difficult to see or dangerous locations.

It would also be highly desirable to provide a remote inspection device which is capable of seeing through tinted windows, smoke, fumes or the like.

Moreover, it would be highly desirable to provide a remote inspection device which is capable of operating in the dark or in low light conditions.

In addition, it would be highly desirable to provide a remote inspection device which is capable of operating without informing nonusers that the inspection device is in operation. To this end, it would be highly desirable that the remote inspection device operates in wavelengths of light which are not seen by the human eye.

SUMMARY OF THE INVENTION

Briefly, and in general terms, the present invention addresses the aforementioned disadvantages by providing a remote inspection device which is capable of enabling the user to inspect objects in difficult to see locations. Moreover, the remote inspection device is capable of operating in the dark or low light and is capable of seeing through certain medium which is impossible for the human eye alone to see through.

The remote inspection device of the present invention includes an elongate housing. The elongate housing is preferably hollow and tubular forming an inner sidewall and outer sidewall and defining a proximal extremity and a distal extremity. As will be explained in greater below, it is preferred that the elongate housing have a length of 24 inches or greater. More preferably, the elongate housing has a length of 36 inches or greater. Moreover, in an additional preferred embodiment, the elongate housing is telescopic, telescoping from a minimum length of less than 12 inches to a maximum length of 36 inches or more, depending on the need for each application.

Extending downwardly from the proximal extremity of the elongate housing is a grip assembly. The grip assembly is configured for receipt of a user's hand and includes a plurality of finger rests for placement of a user's fingers. In addition, the backside of the grip assembly includes a plurality of activation switches, such as trigger switches, toggle switches or buttons, for operating the remote inspection device.

The remote inspection device also includes a video display. Preferably, the video display is mounted near the proximal extremity of the elongate housing by a swivel mount, such as a ball joint mount, located on the upper surface of the elongate housing. The swivel mount enables the user to adjust the video display to different angles as desired by the user.

Attached to the distal extremity of the elongate housing is a tip assembly. The tip assembly is hollow and includes a portal for receiving an image of an object that is desired to be inspected. In a first preferred embodiment, the tip assembly is rotatably mounted to the distal extremity of the elongate housing. In a second preferred embodiment, the tip assembly is detachable from the elongate housing for enabling the user of the remote inspection device to quickly and easily swap or replace the tip assembly of the remote inspection device for repair or for different applications. For example, one embodiment of the tip assembly is configured wherein the portal is substantially circular and faces forwardly such that the center of the portal is concentrically aligned with the longitudinal axis of the elongate housing. Thus, the portal receives light and images from directly in front of the remote inspection device. In an additional embodiment, the portal projects through the sidewall of the tip assembly for receiving light and images to the left, right or from above or below the remote inspection device.

The remote inspection device of the present invention also includes a camera means for creating an image of an object viewed by the remote inspection device. Preferably, the camera means is a charge coupled device (CCD) for creating a visible light image of an object for display on the video display. The display on the video display enables the user to facilitate recognition and evaluation of an object by a user of the remote inspection device. Even more preferably, the camera means of the present invention is a CCD camera which operates in a spectrum of light not visible to the human eye, such as infrared (IR). In operation, the camera means receives invisible light through the tip assembly portal. The camera means then translates this invisible light image into a visible light image for production on the video display.

Preferably, the remote inspection device also employs an invisible light illumination means for projecting invisible light upon an object intended to the inspected. The illumination means operates in the same spectrum of light as the camera means, with the combination providing a night vision system capable of producing a visual image in darkness or under very low level ambient light conditions. In addition, the illumination means and CCD camera of the present invention are capable of looking through tinted windows, smoke, fumes or the like enabling a user of the remote inspection device to inspect and evaluate objects which were previously unviewable.

The remote inspection device of the present invention also includes a power supply. The power supply is connected to the camera means, processor and video display for providing necessary power to each of these components. Preferably, the power supply is in the form of a rechargeable battery pack which may be removed for charging.

In addition to the remote inspection device itself, the present invention relates to specific applications for the device. For example, the present invention includes methods for performing law enforcement inspection. The method includes using a remote inspection device which includes an elongate housing, grip assembly, illumination means, camera means, processing means and video display. The camera means and illumination means operate in a spectrum of light not visible to the human eye enabling the remote inspection device to operate in the dark or low light conditions. The method of inspection includes the step of a law enforcement person or persons approaching an object wished to be inspected with the remote inspection device. The remote inspection device is then positioned so as to project invisible light from the illumination means upon that object. Invisible light is received by the remote inspection device's camera means and an image of the object is created. This image is then processed by the processor and displayed on the video display. The law enforcement personnel thereafter views the image of the object on the video display for inspection and evaluation. This method of law enforcement inspection is particularly useful when conducting a routine traffic stop at night. A police officer approaches an automobile with the remote inspection device of the present invention. The remote inspection device is positioned so that the portal of the tip assembly faces into the driver side window of the automobile. For this inspection, it is preferred that the tip assembly is configured with the portal disposed through the tip assembly's right sidewall so as to easily look through the driver's side windows of an automobile when approaching from the rear. In this manner, a police officer, or other law enforcement person, can stand several feet behind the automobile's driver and passengers, and substantially out of harm's way, when viewing the motorist, any passengers and the interior of the automobile.

In an additional aspect, the invention relates to a method of inspecting a smoke filled building by firefighting personnel. The method of inspection includes the steps of a firefighter entering a building wherein the visibility in the visible light spectrum is obscured by smoke with the remote inspection device. The remote inspection device is thereafter positioned so as to project invisible light from the illumination means upon an object or objects wished to be inspected. The invisible light bounces off the object or objects and is received through the portal of the tip assembly and acquired by the camera means. The camera means, in conjunction with the processor, produces an image which is then displayed on the video display. For this application, it is preferred that the tip assembly be configured with a circular portal having its center concentrically aligned with the longitudinal axis of the elongate housing. In this configuration, the remote inspection device "looks" in the forward direction to enable firefighting personnel to walk through a building where their vision would ordinarily be obstructed by smoke, fumes or the like.

It is thus an object of the present invention to provide a remote inspection device which is portable and easily manipulated by the user.

It is an additional object of the present invention to provide a remote inspection device which is capable of operating in darkness or low light conditions.

It is still another object of the present invention to provide a remote inspection device which has universal applications such as for law enforcement inspection and for firefighting investigation.

Other features and advantages of the present invention will be appreciated by those skilled in the art upon reading the detailed description which follows with reference to the attached drawings.

BRIEF DESCRIPTION OF THE DRAWINGS

FIG. 3 is a side cross-sectional view of the remote inspection device of the present invention;

FIG. 4a is a side cross-sectional view of the remote inspection device illustrating the processor, camera means, illuminator and tip assembly of the present invention;

FIG. 4b is a side cross-sectional view of the remote inspection device of FIG. 4a illustrating the detachable feature of the tip assembly;

FIG. 4c is a side cross-sectional view of the remote inspection device of FIG. 4a including a different tip assembly;

DETAILED DESCRIPTION OF THE INVENTION

Figures 1, 2:
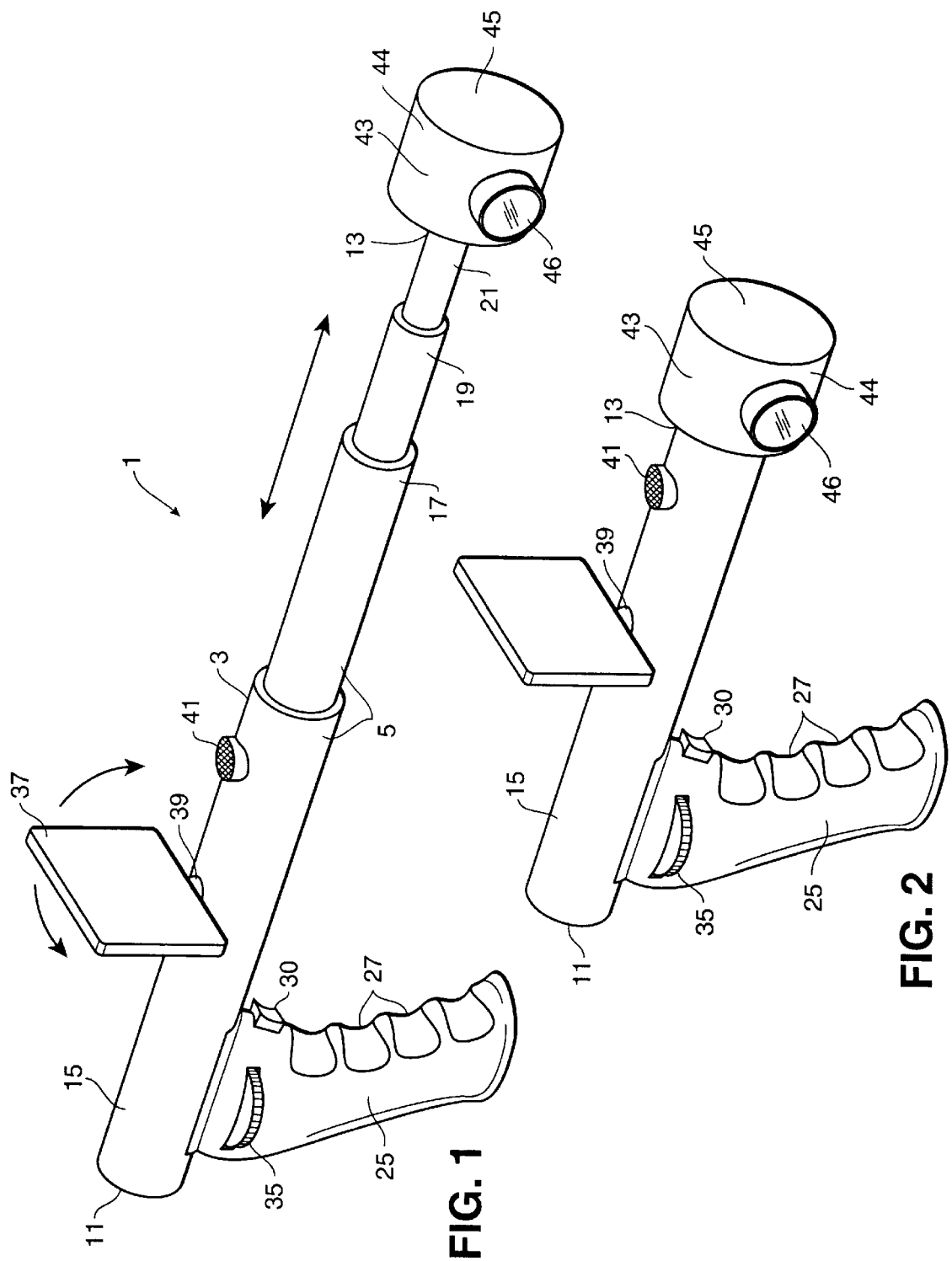
FIG. 1 is a perspective view of the remote inspection device of the present invention illustrating the telescopic feature of the elongate housing.
FIG. 2 is a perspective view of the remote inspection device of FIG. 1 wherein the telescopic housing is in a retracted position.

While the present invention is susceptible of embodiment in various forms, there is shown in the drawings and will hereinafter be described, the presently preferred embodiments of the invention, with the understanding that the present disclosure is to be considered as an exemplification of the invention and is not intended the invention to the specific embodiments illustrated.

With reference to the figures, the present invention provides for an apparatus and methods of use for a remote inspection device 1. The remote inspection device 1 includes an elongate hollow housing 3. The elongate housing 3 includes a proximal extremity 11 and distal extremity 13 with its hollow configuration forming an inner sidewall 7 and an outer sidewall 5. The housing cross section may be of any shape. However, for manufacturing reasons, it is thought that the preferred cross-section is circular, thus providing an elongate housing which is substantially tubular in configuration and forming a bore 9 extending along the longitudinal axis of the elongate housing. Preferably, the elongate housing 3 is 1–2 inches in diameter and has a length of 24 inches or greater. Even more preferably, the elongate housing 3 has a length of 36 inches or greater. Moreover, as shown in FIG. 1, in an additional embodiment, the elongate housing 3 is telescopic and thus divided into a plurality of telescoping centrifugally aligned segments. As shown in FIG. 1, the elongate housing 3 includes four segments 15, 17, 19 and 21, respectively. However, the housing may be configured of any number of segments depending on the manner of use of the remote inspection device 1. Preferably, the remote inspection device has a retracted length of less than 12 inches and an extended length greater than 36 inches.

Figure 5:
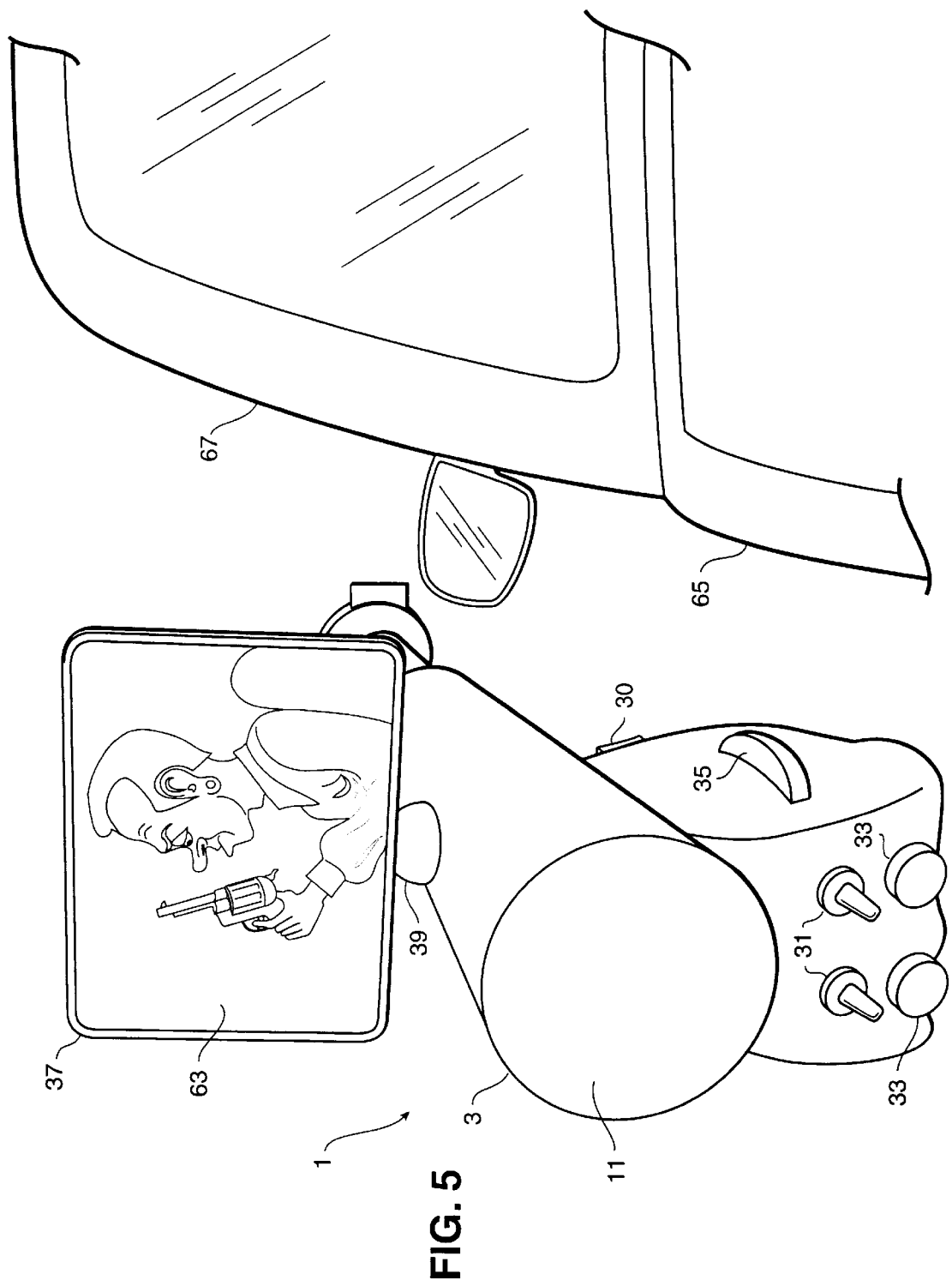
FIG. 5 is a rear perspective view of the remote inspection device of the present invention during a police traffic stop.

Extending downwardly from the proximal extremity 11 of the elongate housing 3 is a grip assembly 25. The grip assembly 25 is economically constructed for receipt of a user's hand and includes a plurality of finger rests 27 for placement of a user's fingers. As shown in FIGS. 3 and 5, the grip assembly 25 includes a plurality of activation switches, such as trigger switch 30, toggle switches 31, buttons 33 and adjuster 35, for controlling the operation of the remote inspection device 1. Moreover, these activation switches may take any of numerous forms known to those skilled in the art for controlling the functions of the remote inspection device. The grip assembly and elongate housing may be constructed of any materials known to those skilled in the art such as aluminum, steel, plastics or composites. However, plastics or composite materials, including fiberglass and carbon fiber, are believed to be preferred materials due to their durability and light-weight characteristics.

In addition, the remote inspection device 1 includes a video display 37. Preferably, the video display 37 is mounted near the proximal extremity 11 of the elongate housing 3. By positioning the video display 37 at the proximal extremity 11 of the elongate housing 3 places the video display 37 nearest to the user's eyes for analysis and evaluation, and also moves the center of gravity of the remote inspection device closest to the user's hand making use of the remote inspection device most comfortable. Preferably, the video display 37 is attached to the elongate housing 3 by a swivel mount 39, such as a ball joint mount. The swivel mount 39 enables the user of the remote inspection device 1 to preferentially adjust the angle of the video display 37 relative to the elongate housing 3 as desired by the user. Moreover, the video display 37 may also include a sun shade or visor (not shown) to reduce glare caused by other light sources striking the video display screen. The video display 37 may be of any type commonly known to those skilled in the art such as cathode ray tube (CRT), liquid crystal display (LCD), light emitting diodes (LED), or Field Emission Display (FED). A 3.7 inch video display manufactured by Sharp Electronics is believed to be particularly suitable for use with the present invention.

Referring to FIGS. 3 and 4, the remote inspection device 1 of the present invention also includes a camera means 49 for creating an image of an object which is intended to be viewed and evaluated. Preferably, the camera means 49 is a charge coupled device (CCD) camera for producing a visible light image of an object on the video display 37. Even more preferably, the camera means 49 is a CCD camera which operates in a spectrum of light not visible to the human eye, preferably the infrared (IR) spectrum between $0.75 \mu m$ and $1000 \mu m$. The CCD detector 49 typically includes a two-dimensional array of 128×128 or 256×256 of infrared sensitive elements for producing electrical signals having intensities proportional to the infrared energy impinging thereon. The infrared sensitive elements are typically made from infrared sensitive semi-conductor material, including but not limited to InSb.

Connecting the camera means 49 to the video display 37 is a processor 47. The processor 47 multiplexes and amplifies the signals received by the camera means 49, such as the CCD element, and then transmits a video image to the video display 37. In addition, it is preferred that the processor 47 provide such image manipulation capabilities such as magnification, image freeze frame, image filtering and clarification, and image rotation. Each of these imaging functions are performed by the processor 47 which thereafter transmits the processed image to the video display 37. Moreover, preferably each of these functions are controlled by the user by means of the activation switches 29 which are also electrically connected to the processor 47. In addition, the processor 47 may include a recorder to record the video display information for later analysis or evaluation.

In addition, the remote inspection device 1 includes a tip assembly 43 attached to the distal extremity 13 of the elongate housing 3. As shown in the figures, the tip assembly 43 includes a sidewall 44 and a distal face 45. The tip assembly 43 is hollow and includes a portal 46 for receiving light that is reflected or emitted from an object that is desired to be inspected or evaluated. In a preferred embodiment, the tip assembly 43 is rotatably mounted to the distal extremity 13 of the elongate housing 3. As shown in FIG. 4b, the distal extremity 13 of the elongate housing 3 is formed with a collar 69 configured to be received within a recess 71 formed in the inner region of the tip assembly 43. This construction permits the tip assembly 43, and corresponding recess 71, to engage the collar 69 of the elongate housing 3 to permit relative rotation of the tip assembly 43 with respect about the longitudinal axis of the elongate housing 3. In one embodiment of the invention, the tip assembly 43 is manually rotated relative to the elongate housing 3. In an additional embodiment, the tip assembly is rotated by a stepper motor or the like controlled by the activation switched located in the grip assembly 25.

Even more preferred, the tip assembly 43 is detachable from the elongate housing 3 for enabling a user of the remote inspection device 1 to replace tip assembly 43 for different applications. For example, as shown in FIG. 4c, in one embodiment the tip assembly 43 is configured with the portal 46 projecting through the distal face 45 such that the portal 46 faces forwardly with respect to the remote inspection device 1. This construction permits light and images to be received from directly in front of the remote inspection device 1 and its user. As shown in FIGS. 1, 2, 3, 4a, 4b, &5, in another embodiment the portal 46 projects laterally through the tip assembly sidewall 44. This construction permits light images to be received through the portal 46 from the left, right, above or below the remote inspection device 1 depending on the rotational alignment of the tip assembly 43 relative to the elongate housing 3. Moreover, the rotational feature of the tip assembly 43 permits the user of the remote inspection device 1 to rotate the tip assembly 43 for different applications. As shown in FIGS. 3 and 4, for this embodiment, the tip assembly 43 includes an image bender 53. As shown in the figures, the image bender 53 is a mirror which reflects light, and a corresponding image, through the portal 46 and reflects that light and image upon the camera means 49. In the alternative to a mirror, a prism or the like may also be used for focusing light received through the tip assembly 43 upon the camera means 49 without detracting from the scope of the present invention. For example, when a user is attempting to inspect or evaluate an object to the right of the remote inspection device 1, the tip assembly 43 is rotated such that the portal 46 faces to the right. Light emitted or reflected off the object is then received through the portal 46 by the camera means 49 for producing a display of the object on the video display 37. Where the user of the remote inspection device 1 wishes to inspect and evaluate an object to the left of the remote inspection device, or above or below the remote inspection device, the tip assembly 43 is simply rotated accordingly.

Preferably, disposed between the tip assembly 43 and camera means 49 is a focusing lens 55. The focusing lens 55 is slidably attached within the elongate housing 3 by a track 57. The focusing lens 55 is constructed to slide longitudinally within the elongate housing 3 within track 57 to adjustably focus light and corresponding images received through portal 46 upon camera means 49. Preferably, the position of the focusing lens 55 is controlled by a stepper motor or the like controlled by focus adjuster 35 located in the grip assembly 25. In an additional embodiment, the focusing lens 55 may be automatically adjusted by the processor 47 for maximum clarity.

In addition, the remote inspection device 1 of the present invention includes an illuminator 51. The illuminator 51 operates in the same invisible spectrum of light within which the camera means 49 operates. Preferably, the illuminator 51 and camera means 49 operate in the infrared spectrum between 0.75$\mu$m and 1000$\mu$m. As shown in FIGS. 3 and 4, the illuminator 51 consists of a plurality of light emitting diodes (LED) constructed in an annular configuration within elongate housing 3. The light emitting diodes of the illuminator 51 are positioned to face forwardly as to emit IR light through the tip assembly 43 and specifically portal 46. Moreover, the illuminator 51 includes a central hole 52 permitting light and a corresponding image to be received by the camera means 49 through the illuminator 51, focusing lens 55, tip assembly 43 and portal 46. For protection of the illuminator 51, and in order to project invisible light in the direction of objects wished to be inspected and evaluated, it is preferred that the illuminator 51 be constructed in this manner within the elongate housing 3. However, the illuminator 51 may also be attached to the exterior of the tip assembly 43 or to the exterior of the elongate housing 3 without detracting from the scope of the present invention. As shown in FIG. 4a, the light emitting diodes project light forwardly with respect to the remote inspection device directly through the focusing lens 55 and portal 46. Meanwhile, in an additional embodiment shown in FIG. 4a, the light emitting diodes of the illuminator 51 project light through the focusing lens 55 to impinge upon image bender 53 and thereafter through portal 46.

In an additional embodiment, the remote inspection device includes a transmitter (not shown) connected to the processor 47 for transmitting video display information to a location distant from the remote inspection device. The transmitter may be any of those commonly known to those skilled in the art such as cable, radio frequency (rf), infrared (IR), etc., thus enabling the video display information to be seen or recorded at a distant location for later analysis. The date and time may also be recorded contemporaneously with the use of the remote inspection device and transmitted with the video display information to provide an accurate representation of events as they occur. Where the remote inspection device includes a transmitter for transmitting video display information, the system also includes a receiver for receiving the video display information and a second video display for reproducing the images created by the remote inspection device.

In still an additional embodiment, the remote inspection device of the present invention includes a microphone 41 located on the exterior of elongate housing 3. The microphone is provided to transmit an audio record of sounds in the vicinity of the remote inspection device to a location distant for the remote inspection device. Preferably, this audio information is transmitted, along with the video display information, by the transmitter means.

Figure 6:
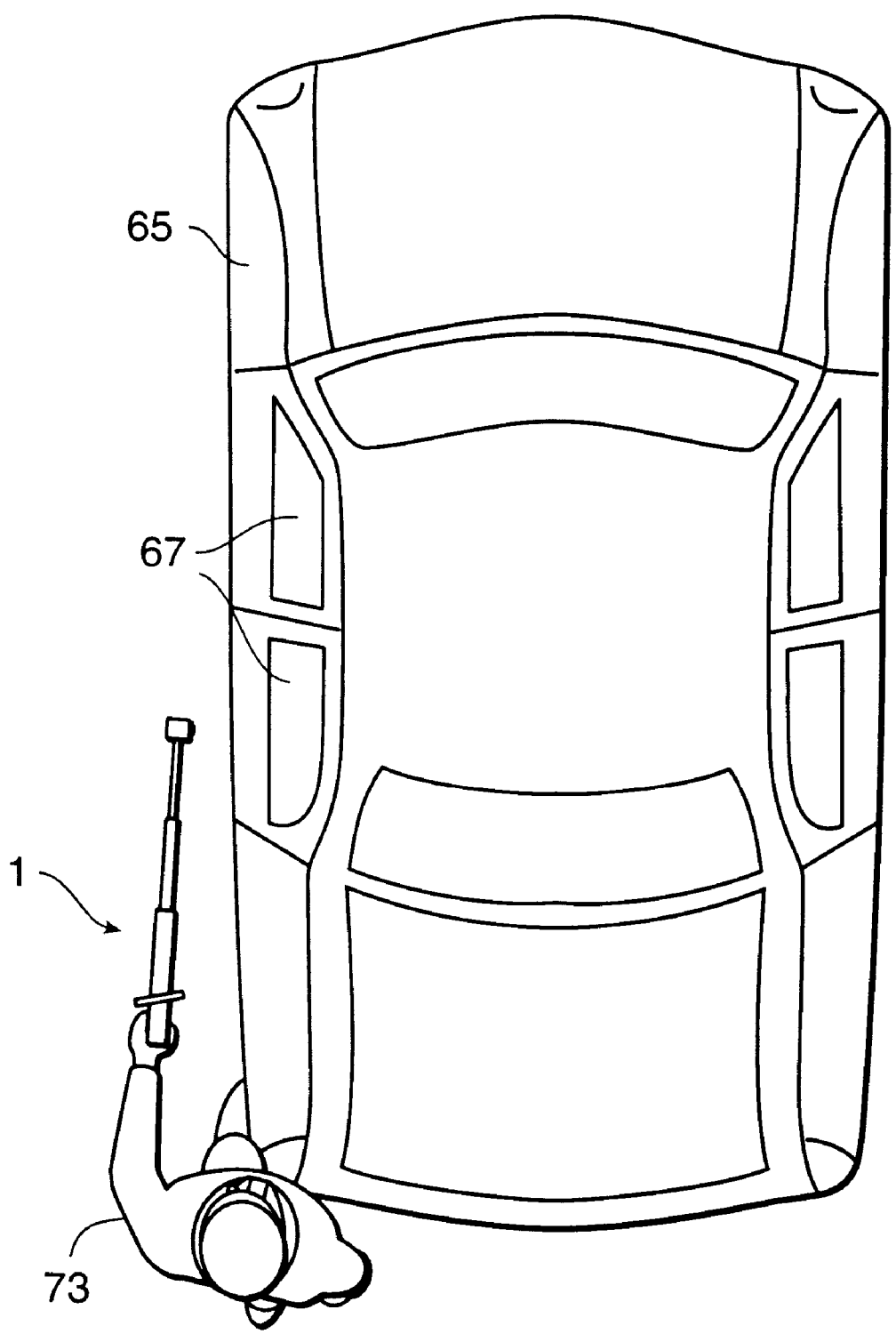
FIG. 6 is a top view illustrating the remote inspection device of FIG. 5 during a police traffic stop.

In operation, the user of the remote inspection device 1 holds the device so as to point the portal 46 of the tip assembly 43 toward an object intended to be inspected. For example, when using the tip assembly 43 including a portal 46 projecting through the tip assembly sidewall 44, the substantial length of the elongate housing 3 provides for a device which is ideally suited for "looking" around corners. This device is also ideally suited for law enforcement personnel, such as police officers, when conducting a routine traffic stop. As shown in FIGS. 5 and 6, the tip assembly 43 is positioned with the portal 46 facing the left driver's side windows 67. Thus, the police operator 73 of the remote inspection device 1 is able to remain several feet behind the driver of the automobile 65 and substantially out of harm's way. Invisible light is emitted from the illuminator 51 which enters through the driver's side window 67 and reflects upon the interior of the automobile 65 and upon the driver himself. This invisible light is then reflected back through the driver's side window 67 and received through portal 46, focused by focusing lens 55 and received by camera means 49. A visible light image is then produced by the camera means 49 and processed by processor 47. The processor 47 transmits the image to the video display 37 for evaluation by the police officer. The use of invisible light makes it very difficult for a motorist to determine that he or she is being inspected by remote inspection device 1, thereby eliminating any element of surprise which a motorist may envision during an assault or attack upon the police officer. Moreover, the use of infrared light has been found to be effective in conducting inspections during police traffic stops even through tinted windows. The video display information is evaluated by the police officer standing to the left and at the rear of the vehicle to determine whether the situation is sufficiently safe to further approach the motorist. The video display information and audio information is also transmitted by the device's transmitter to a dash mounted receiver and video located in a nearby police car. The user's partner is thus able to analyze the circumstances of traffic stop and provide aid or call for assistance where warranted. Preferably, the video display information is also transmitted to a receiver and video display located at police headquarters for recording and/or analysis by additional law enforcement personnel.

The remote inspection device of the present invention is clearly capable of recording the identity of the motorist, license plate, make and model of the automobile, and conduct of both the motorist and officer, including audio recording any dialogue that takes place between the motorist and officer. Accordingly, not only will the remote inspection device of the present invention act as a deterrent to attacks on police officers, but the video and audio recording may thus be useful during a later investigation or as evidence in a later trial.

The remote inspection device 1 of the present invention is also believed to be ideally suited for inspection by firefighting personnel or the like, when inspecting a burning building. For such application, it is believed advantageous to utilize a tip assembly 43 wherein the portal 46 projects through the tip assembly distal face 45 (FIG. 4c). Moreover, it is also believed that it would be advantageous for firefighting personnel to use the remote inspection device 1 with the elongate housing 3 in the retracted position (FIG. 2) to reduce the chance of inadvertently striking the distal extremity 13 of the elongate housing 3 and tip assembly 43 against walls or furniture when moving through a burning building. In operation, upon entering a smoke filled building with a remote inspection device 1 of the present invention, a firefighter is capable of "seeing" through smoke as the infrared features of the illuminator 51 and camera means 49 are capable of creating images of objects which are incapable of being perceived with the human eyes alone. Again, the video display and audio information may be transmitted to a distant location for recording or analysis by additional firefighting personnel.

Many changes may be made within the scope of the present invention. For example, it is envisioned that the remote inspection device will have innumerable uses not discussed above. For example, it is believed that the remote inspection device is ideally suited for inspection by customs, drug enforcement, border patrol, etc. in their daily activities. The invention may be embodied in still other forms and other applications without departing from the spirit or essential characteristics of the invention. Although particular preferred embodiments of the present invention have been specifically described herein, it is to be understood that variations may be made in the construction, materials, shape and applications for the remote inspection device without departing from the spirit or scope of the invention. Having described my invention is such terms to enable those skilled in the art to make and use it, and having identified the presently preferred embodiments thereof, I claim:

What is claimed is:

1. A mobile handheld remote inspection device including:
   an elongate housing having a proximal extremity and a distal extremity and a longitudinal axis traversing the length of said housing, said housing having a length greater than twenty-four (24) inches;
   a grip assembly attached to said housing for enabling a user to hold and carry the remote inspection device;
   an illumination means for illuminating an object with light;
   a camera means operating in the spectrum of light of said illumination means for creating an image of the object illuminated by said illumination means;
   a tip assembly attached to the distal extremity of said housing, said tip assembly including a portal for receiving light for projection upon said camera means;
   a video display mounted substantially at the proximal extremity of said housing for displaying an image created by said camera means;
   a processor for communicating an image of an object created by said camera means to said video display; and
   power supply connected to said illumination means, camera means and video display.

2. The mobile handheld remote inspection device of claim 1 wherein said tip assembly includes one of more lenses for focusing light received through said portal upon said camera means.

3. The mobile handheld remote inspection device of claim 1 wherein said camera means is a charge coupled device (CCD) camera.

4. The mobile handheld remote inspection device of claim 1 wherein said grip is in the form of a pistol grip.

5. The mobile handheld remote inspection device of claim 1 further comprising a transmitter for transmitting an image created by said camera means to a location distant from said remote inspection device.

6. A mobile handheld remote inspection device including:
   an elongate housing having a proximal extremity and a distal extremity and a longitudinal axis traversing the length of said housing, said housing being telescopic enabling said housing to extend or retract in the direction of said longitudinal axis as desired by a user;

a grip assembly attached to said housing for enabling a user to hold and carry the remote inspection device;

an illumination means for illuminating an object with light;

a camera means operating in the spectrum of light of said illumination means for creating an image of the object illuminated by said illumination means;

a tip assembly attached to the distal extremity of said housing, said tip assembly including a portal for receiving light for projection upon said camera means;

a video display mounted substantially at the proximal extremity of said housing for displaying an image created by said camera means;

a processor for communicating an image of an object created by said camera means to said video display; and power supply connected to said illumination means, camera means and video display.

7. A mobile handheld remote inspection device including:

an elongate housing having a proximal extremity and a distal extremity and a longitudinal axis traversing the length of said housing;

a grip assembly attached to said housing for enabling a user to hold and carry the remote inspection device;

an illumination means for illuminating an object with light;

a camera means operating in the spectrum of light of said illumination means for creating an image of the object illuminated by said illumination means;

a tip assembly detachably attached to the distal extremity of said housing, said tip assembly being detachable and replaceable, said tip assembly further including a portal for receiving light for projection upon said camera means;

a video display mounted substantially at the proximal extremity of said housing for displaying an image created by said camera means;

a processor for communicating an image of an object created by said camera means to said video display; and power supply connected to said illumination means, camera means and video display.

8. A mobile handheld remote inspection device including:

an elongate housing having a proximal extremity and a distal extremity and a longitudinal axis traversing the length of said housing;

a grip assembly attached to said housing for enabling a user to hold and carry the remote inspection device;

an illumination means for illuminating an object with light;

a camera means operating in the spectrum of light of said illumination means for creating an image of the object illuminated by said illumination means;

a tip assembly attached to the distal extremity of said housing, said tip assembly being rotatable about said longitudinal axis of said elongate housing, said tip assembly further including a portal for receiving light for projection upon said camera means;

a video display mounted substantially at the proximal extremity of said housing for displaying an image created by said camera means;

a processor for communicating an image of an object created by said camera means to said video display; and power supply connected to said illumination means, camera means and video display.

9. A mobile handheld remote inspection device including:

an elongate housing having a proximal extremity and a distal extremity and a longitudinal axis traversing the length of said housing;

a grip assembly attached to said housing for enabling a user to hold and carry the remote inspection device;

an illumination means for illuminating an object with light;

a camera means operating in the spectrum of light of said illumination means for creating an image of the object illuminated by said illumination means;

a tip assembly attached to the distal extremity of said housing, said tip assembly including a portal for receiving light for projection upon said camera means being angled relative to said longitudinal axis of said elongate housing;

a video display mounted substantially at the proximal extremity of said housing for displaying an image created by said camera means;

a processor for communicating an image of an object created by said camera means to said video display; and power supply connected to said illumination means, camera means and video display.

10. A mobile handheld remote inspection device including:

an elongate housing having a proximal extremity and a distal extremity and a longitudinal axis traversing the length of said housing;

a grip assembly attached to said housing for enabling a user to hold and carry the remote inspection device;

an illumination means for illuminating an object with light;

a camera means operating in the spectrum of light of said illumination means for creating an image of the object illuminated by said illumination means;

a tip assembly attached to the distal extremity of said housing, said tip assembly including a portal for receiving light for projection upon said camera means being angled relative to said longitudinal axis of said elongate housing, said tip assembly further including an image bender for bending the path of light received through said portal and for projecting that image upon said camera means;

a video display mounted substantially at the proximal extremity of said housing for displaying an image created by said camera means;

a processor for communicating an image of an object created by said camera means to said video display; and power supply connected to said illumination means, camera means and video display.

11. The mobile handheld remote inspection device of claim 10 wherein said image bender is comprised of one or more mirrors.

12. The mobile handheld remote inspection device of claim 10 wherein said image bender is a prism.

13. A method of performing law enforcement inspection using a mobile handheld remote inspection device, the remote inspection device including a housing, a grip assembly, an illumination means for illuminating an object in a spectrum of light not visible to the human eye, a camera means operating in the spectrum of light of said illumination means for creating an image of the object illuminated by said illumination means, and a video display for displaying an image created by said camera means, the method of inspection comprising the steps of:

approaching an object with the remote inspection device;

positioning the remote inspection device so as to project light from the illumination means upon the object;

creating an image of the object by the camera means;

displaying an image of the object upon the video display; and viewing an image of the object on the video display.

14. The method of performing law enforcement inspection of claim 13 using a mobile handheld remote inspection device, wherein the object is an automobile.

15. The method of performing law enforcement inspection of claim 13 wherein the remote inspection device further includes a transmitter for transmitting an image created by said camera means to a location distant from said remote inspection device, the method further comprising the step of:

transmitting an image created by the camera means to a location distant from said remote inspection device.

16. The method of performing law enforcement inspection of claim 15 wherein the image is transmitted to a law enforcement vehicle.

17. The method of performing law enforcement inspection of claim 15 wherein the image is transmitted to a law enforcement headquarters.

18. The mobile handheld remote inspection device as in any of claims 1–10 wherein said illumination means projects light invisible to the human eye.

19. A method of inspecting a smoke filled building using a mobile handheld remote inspection device, the remote inspection device including a housing, a grip assembly, an illumination means for illuminating an object in a spectrum of light not visible to the human eye, a camera means operating in the spectrum of light of said illumination means for creating an image of the object illuminated by said illumination means, and a video display for displaying an image created by said camera means, the method of inspection comprising the steps of:

entering a building wherein the visibility in the visible light spectrum is obscured by smoke;

approaching an object with the remote inspection device;

positioning the remote inspection device so as to project light from the illumination means upon the object;

creating an image of the object by the camera means;

displaying an image of the object upon the video display; and viewing an image of the object on the video display.

\* \* \* \* \*